US010991936B2

United States Patent
Yang et al.

(10) Patent No.: US 10,991,936 B2
(45) Date of Patent: *Apr. 27, 2021

(54) ANODE COMPOSITION, METHOD FOR PREPARING ANODE AND LITHIUM ION BATTERY

(71) Applicant: Robert Bosch GmbH, Stuttgart (DE)

(72) Inventors: Jun Yang, Shanghai (CN); Yitian Bie, Shanghai (CN); Jingjun Zhang, Shanghai (CN); Yuqian Dou, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 247 days.

This patent is subject to a terminal disclaimer.

(21) Appl. No.: 16/065,874

(22) PCT Filed: Dec. 23, 2015

(86) PCT No.: PCT/CN2015/098445
§ 371 (c)(1),
(2) Date: Jun. 25, 2018

(87) PCT Pub. No.: WO2017/107103
PCT Pub. Date: Jun. 29, 2017

(65) Prior Publication Data
US 2019/0013514 A1    Jan. 10, 2019

(51) Int. Cl.
*H01B 1/24*    (2006.01)
*H01M 4/62*    (2006.01)
(Continued)

(52) U.S. Cl.
CPC .............. *H01M 4/364* (2013.01); *H01B 1/24* (2013.01); *H01M 4/0404* (2013.01);
(Continued)

(58) Field of Classification Search
CPC ......... H01B 1/00; H01B 1/24; H01M 4/0402; H01M 4/0404; H01M 4/134; H01M 4/386; H01M 4/622
See application file for complete search history.

(56) References Cited

U.S. PATENT DOCUMENTS

2011/0111304 A1    5/2011   Cui et al.
2012/0034516 A1    2/2012   Koo et al.
(Continued)

FOREIGN PATENT DOCUMENTS

CN    103155068 A         6/2013
CN    103474666 A    *    12/2013
(Continued)

OTHER PUBLICATIONS

JP 2015069878 (pub Apr. 2015) English language machine translation.*
(Continued)

*Primary Examiner* — Mark Kopec
(74) *Attorney, Agent, or Firm* — Michael Best & Friedrich LLP (57) ABSTRACT

Provided is an anode composition for lithium ion batteries, comprising a) a silicon-based active material; b) a carboxyl-containing binder; and c) a silane coupling agent. Also provided are a process for preparing an anode for lithium ion batteries and a lithium ion battery.

16 Claims, 3 Drawing Sheets (51) Int. Cl.
*H01M 4/38* (2006.01)
*H01M 4/36* (2006.01)
*H01M 4/134* (2010.01)
*H01M 4/04* (2006.01)
*H01M 10/0525* (2010.01)
*H01M 10/052* (2010.01)
*H01M 4/02* (2006.01)

(52) U.S. Cl.
CPC ........... *H01M 4/134* (2013.01); *H01M 4/366* (2013.01); *H01M 4/386* (2013.01); *H01M 4/62* (2013.01); *H01M 4/621* (2013.01); *H01M 4/622* (2013.01); *H01M 10/0525* (2013.01); *H01M 10/052* (2013.01); *H01M 2004/027* (2013.01)

(56) References Cited

U.S. PATENT DOCUMENTS

| | | |
|---|---|---|
| 2012/0244435 A1 | 9/2012 | Hirose et al. |
| 2014/0050975 A1 | 2/2014 | Cha et al. |
| 2014/0231719 A1 | 8/2014 | Cha et al. |
| 2014/0346618 A1 | 11/2014 | Lahlouh et al. |
| 2016/0211522 A1* | 7/2016 | Kurihara ................. H01M 4/04 |
| 2018/0205085 A1* | 7/2018 | Yang ..................... H01M 4/622 |

FOREIGN PATENT DOCUMENTS

| | | |
|---|---|---|
| JP | 2012212632 A | 11/2012 |
| JP | 5678419 B2 | 3/2015 |
| JP | 2015069878 A | 4/2015 |
| JP | 2015213003 A | 11/2015 |
| JP | 2017537449 A | 12/2015 |
| WO | 2015046517 A1 | 4/2015 |
| WO | 2016089811 A | 6/2016 |

OTHER PUBLICATIONS

WO/2015/046517 (pub Apr. 2015) English language machine translation.*
International Search Report and Written Opinion for Application No. PCT/CN2015/098445 dated Aug. 23, 2016 (9 pages).
International Search Report for Application No. PCT/CN2016/085901 dated Feb. 28, 2017 (2 pages).

* cited by examiner

ANODE COMPOSITION, METHOD FOR PREPARING ANODE AND LITHIUM ION BATTERY

TECHNICAL FIELD

The present invention relates to an anode composition for lithium ion batteries, a process for preparing an anode for lithium ion batteries, and a lithium ion battery.

BACKGROUND

Lithium ion batteries have now been widely used in energy storage systems and electric vehicles.

Silicon is a promising active material for electrodes of lithium ion batteries owning to its large theoretical capacity and moderate operating voltage. However, during the lithiation/delithiation processes, silicon undergoes dramatic expansion and contraction. Such huge volumetric change impairs the electrochemical performances of lithium ion batteries.

There is an on-going demand for more attractive and reliable lithium ion batteries.

SUMMARY OF THE INVENTION

After intensive study, the inventors have now developed a novel anode composition for lithium ion batteries, comprising:
 a) a silicon-based active material;
 b) a carboxyl-containing binder;
 c) a silane coupling agent represented by the following formula (1):

$$Y-(CH_2)_n-Si-X_3 \quad (1)$$

wherein Y represents a non-hydrolytic group that is capable of forming a conductive polymer moiety upon polymerization;

X each independently represents a hydroxyl group, or a hydrolysable group selected from the group consisting of halogen atoms, alkoxy groups, ether groups and siloxy groups; and the three X groups may be identical with or different from each other; and n represents an integer from 0 to 3.

Optionally, the anode composition according to the present disclosure may further comprise: d) a carbon material, wherein the carbon material may be selected from the group consisting of carbon black, super P, acetylene black, Ketjen black, graphite, graphene, carbon nanotubes and vapour grown carbon fibers.

Optionally, the anode composition according to the present disclosure may further comprise: e) a chain extender, which copolymerizes with the conductive polymer moiety obtainable from the silane coupling agent. Preferably, the chain extender may be selected from the group consisting of aniline, pyrrole, thiophene and their derivatives.

In some examples, the anode composition according to the present disclosure may comprise:
 a) from 5% to 85% by weight of the silicon-based active material;
 b) from 5% to 25% by weight of the carboxyl-containing binder;
 c) the silane coupling agent;
 d) from 0 to 80% by weight of the carbon material; and
 e) from 0 to 30% by weight of the chain extender, wherein the weight percents of components a), b), d) and e) are based on the total weight of the anode composition, and preferably, the weight ratio of the silane coupling agent to the silicon-based active material is no less than 0.01:100 but less than 3:100.

Also provided is a process for preparing an anode, comprising:
 preparing a slurry by mixing all components of the anode composition according to the present disclosure with water or a water-containing solvent;
 allowing the silane coupling agent to polymerize so as to obtain a polymerized product; and
 coating the polymerized product onto a current collector.

Also provided is a lithium ion battery, comprising an anode prepared from the anode composition according to the present disclosure, or an anode prepared by the process according to the present disclosure.

Surprisingly, the inventors found that by employing the anode composition according to the present invention, the lithium ion battery exhibits excellent electrochemical properties, including cycling performance and rate performance.

These and other features, aspects and advantages of the present disclosure will become evident to those skilled in the art from the following description of various examples taken in conjunction with the accompanying drawings.

Reference will now be made to some illustrative examples, and specific language will be used herein to describe the same. It will nevertheless be understood that no limitation of the scope of the disclosure is thereby intended.

DETAILED DESCRIPTION OF THE INVENTION

Throughout this disclosure, all the scientific and technical terms, unless otherwise indicated, shall have the same meanings as those known to a person skilled in the art. Where there is inconsistency, the definition provided in the present disclosure should be taken.

It should be understood that the detailed description of all materials, processes, examples and drawings are presented for the purposes of illustration, and therefore, unless expressly specified otherwise, are not construed as limitations of the present disclosure.

Herein, the terms "cell" and "battery" may be interchangeably used. The terms "lithium ion cell" or "lithium ion battery" may also be abbreviated to "cell" or "battery".

Herein, the term "comprising" means that other ingredients or other steps which do not affect the final effect can be included. This term encompasses the terms "consisting of" and "consisting essentially of". The product and process according to the present disclosure can comprise, consist of, and consist essentially of the essential technical features and/or limitations of the present disclosure described herein, as well as an additional and/or optional ingredients, components, steps, or limitations described herein.

The use of the terms "a", "an" and "the" and similar referents in the context of describing the subject matter of this application (especially in the context of the following claims) are to be construed to cover both the singular and the plural, unless otherwise indicated herein or clearly contradicted by context.

Unless otherwise specified, every numerical range in this context intends to include both endpoints and any numbers and sub-ranges falling within said numerical ranges.

Unless specially indicated, all materials and agents used in the present disclosure are commercially available.

Examples of the present disclosure are described in detail as follows.

Component a): Silicon-Based Active Material

According to some examples of the present disclosure, the anode composition for lithium ion batteries may comprise a silicon-based active material. Comparing with a carbon-based active material, a silicon-based active material possesses a larger theoretical capacity and a more moderate operating voltage.

The term "active material" as used herein means a material which is able to have lithium ions inserted therein and release lithium ion therefrom during repeated charging/discharging cycles.

There is no specific limitation to the silicon-based active material, and those which are known for use in lithium ion batteries may be used. In some examples, the silicon-based active material may be selected from the group consisting of silicon, silicon alloys and silicon/carbon composites. In some examples, the silicon alloy may comprise silicon and one or more metals selected from the group consisting of Ti, Sn, Al, Sb, Bi, As, Ge and Pb.

In some examples, the silicon-based active material may be in the form of powders, or may be ground into powders.

According to some examples of the present disclosure, the content of the silicon-based active material may be from 5% to 85% by weight, based on the total weight of the anode composition. For example, the content of the silicon-based active material may be about 5%, about 10%, about 15%, about 20%, about 25%, about 30%, about 35%, about 40%, about 45%, about 50%, about 55%, about 60%, about 65%, about 70, about 75%, about 80% and about 85% by weight, based on the total weight of the anode composition.

Component b): Carboxyl-Containing Binder

According to some examples of the present disclosure, the anode composition may comprise a carboxyl-containing binder.

There is no specific limitation to the carboxyl-containing binder, and those which are known for use in lithium ion batteries may be used. In some examples, the carboxyl-containing binder may be a carboxylic acid, or a mixture of a carboxylic acid and its alkali metal salt, wherein the carboxylic acid may be selected from the group consisting of polyacrylic acid (PAA), carboxymethyl cellulose, alginic acid and xanthan gum. In some examples, the alkali metal salt may be selected from the group consisting of a lithium salt, sodium salt and potassium salt.

According to some examples of the present disclosure, the content of the carboxyl-containing binder may be from 5% by weight to 25% by weight, for example, from 10% by weight to 20% by weight (e.g. about 10%, about 15% and about 20% by weight), based on the total weight of the anode composition.

Component c): Silane Coupling Agent

According to some examples of the present disclosure, the anode composition may comprise a silane coupling agent represented by the following formula (1):

wherein Y represents a non-hydrolytic group that is capable of forming a conductive polymer moiety upon polymerization;

X each independently represents a hydroxyl group, or a hydrolysable group selected from the group consisting of halogen atoms, alkoxy groups, ether groups and siloxy groups; and the three X groups may be identical with or different from each other; and n represents an integer from 0 to 3.

In the context of the present disclosure, the term "non-hydrolytic group" means a group that does not hydrolyze to form a hydroxyl group when being brought into contact with water or a water-containing solvent.

In the context of the present disclosure, the term "hydrolysable group" means a group that is capable of hydrolyzing to form a hydroxyl group when being brought into contact with water or a water-containing solvent.

In the context of the present disclosure, each of the terms "alkyl group", "alkoxy group", "alkenyl group" and "alkynyl group" may independently represent a linear, branched or cyclic group, and may independently contain from 1 to 12 carbon atoms, for example, from 1 to 10 carbon atoms, from 1 to 8 carbon atoms or from 1 to 4 carbon atoms.

In the context of the present disclosure, each of the terms "aromatic group" and "aroxy group" may independently contain from 6 to 12 carbon atoms, for example, contain 6, 7, 8, 9, 10, 11 or 12 carbon atoms.

In some examples, X may independently be a hydroxyl group. In some examples, X may independently be a halogen atom, such as a fluorine atom, a chlorine atom, a bromine atom or an iodine atom. In some examples, X may independently be an alkoxy group, wherein the alkoxy group may have the same definition as mentioned above. In some examples, X may independently be an ether group, for example, an ether group having a structure represented by $-O(CH_2)_m OR^c$, wherein $R^c$ may represent a hydrogen atom or an alkyl group, and the alkyl group may have the same definition as mentioned above; and m represents an integer from 0 to 4 (e.g., 0, 1, 2, 3 or 4). In some examples, X may independently be a siloxy group, for example, a siloxy group having a structure represented by $-OSiR^d_3$, wherein $R^d$ each independently represents a hydrogen atom or an alkyl group, and the alkyl group may have the same definition as mentioned above. The three $R^d$ groups in $-OSiR^d_3$ of the siloxy group may be identical with or different from each other.

In some examples, Y may comprise an aromatic conjugated moiety. In some examples, Y may be derived from aniline, pyrrole, thiophene and any combination thereof. In some examples, Y may be selected from the group consisting of and ;

wherein * indicates the position where Y is linked to a moiety represented by —(CH$_2$)$_n$—Si—X$_3$ in the silane coupling agent; R$^a$ and R$^b$ each independently represents a hydrogen atom, or a substituent selected from the group consisting of alkyl groups, alkoxy groups, alkenyl groups, alkynyl groups, aromatic groups and aroxy groups. In some examples, Y group in formula (1) may represent and in these cases, Y may be abbreviated as an "aniline-derived moiety". In order to allow the "aniline-derived moiety" in the silane coupling agent to polymerize as expected, it is preferred that the para-position to "—NH—" or "—NHR$^b$" is occupied by hydrogen atom, rather than any substituent.

In some examples, Y group in formula (1) may represent and in this case, Y may be abbreviated as a "pyrrole-derived moiety". In some examples, Y group in formula (1) may represent and in this case, Y may be abbreviated as a "thiophene-derived moiety". In order to allow the "pyrrole-derived moiety" or "thiophene-derived moiety" in the silane coupling agent to polymerize as expected, it is preferred that the ortho-position to "—NH—" or to the sulfur atom is occupied by hydrogen atom, and a substituent (if any) may locate at a meta-position to "—NH—" or to the sulfur atom.

In the case where Y is there may be one, two, three or four R$^a$ groups altogether, and these R$^a$ groups may be identical with or different from each other. In the case where Y is there may be one, two or three R$^a$ groups altogether, and these R$^a$ groups may be identical with or different from each other.

In some examples, in formula (1), X each independently is an alkoxy group, and Y is wherein the three X groups may be identical with or different from each other. In this case, the silane coupling agent may be represented by formula (2):

(2)

wherein R$^a$ and n have the same definitions as those given for formula (1), R$^e$ each independently represents an alkyl group, the alkyl group may have the same definition as mentioned above, and the three R$^e$ groups may be identical with or different from each other.

Examples of the silane coupling agents represented by formula (2) may include, but not limited to, N-[(trimethoxysilyl)methyl]aniline, N-[(triethoxysilyl)methyl]aniline, N-[(trimethoxysilyl)ethyl]aniline, N-[(triethoxysilyl) ethyl]aniline, N-[3-(trimethoxysilyl)propyl]aniline and N-[3-(triethoxysilyl)propyl]aniline. For example, N-[(triethoxysilyl)methyl])aniline may be commercially available from Nanjing Diamond Chem Co. Ltd under the product name of ND42.

N-[(triethoxysilyl)methyl])aniline (ND42)

According some examples of the present disclosure, the weight ratio of the silane coupling agent to the silicon-based active material may be no less than 0.01:100 but less than 3:100, for example, from 0.01:100 to 2.5:100, from 0.01:100 to 2:100, from 0.1:100 to 1:100, or being about 0.5:100.

Although not intended to be bound by theories, it is presumed that the following reaction mechanisms apply to the silane coupling agent, the silicon-based active material and the carboxyl-containing binder according to the present disclosure.

i) Hydrolysis of the Silane Coupling Agent

In the case where any one of the X groups in formula (1) represents a hydrolysable group, the hydrolysable group may hydrolyze upon contact with water or a water-containing solvent and thus form a hydroxyl group. The hydrolyzed product of the silane coupling agent may have a structure of silanol, for example, a completely hydrolyzed product of the silane coupling agent may be represented by Y—(CH$_2$)$_2$—Si—(OH)$_3$.

In the case where all of the three X groups in formula (1) represent hydroxyl groups, the silane coupling agent may be represented by Y—(CH$_2$)$_n$—Si—(OH)$_3$, therefore, the hydrolysis of the silane coupling agent may be omitted.

ii) Reaction of Hydrolyzed Silane Coupling Agents Per Se, and Reaction Between the Hydrolyzed Silane Coupling Agent and the Silicon-Based Active Material Since silicon has a high affinity for oxygen, an oxide layer will spontaneously form on the surface of silicon upon exposure to air even at room temperature. Therefore, there is usually a natural silicon oxide layer on the surface of the silicon-based active material. The surface layer of silicon oxide contains hydroxyl groups, i.e., silanol groups —Si—OH.

The hydroxyl groups contained in the hydrolyzed silane coupling agent (e.g., Y—(CH$_2$)$_n$—Si—(OH)$_3$) may condense with the hydroxyl groups on the surface of the silicon-based active material, with a water molecule being eliminated.

Condensation may also occur between the Si—OH groups in adjacent hydrolyzed silane coupling agents (e.g., Y—(CH$_2$)$_n$—Si—(OH)$_3$) per se, which enhances the cross-linking degree of the final polymerized product as mentioned below.

iii) Formation of a Conductive Polymer Moiety by Polymerization of the Aromatic Conjugated Moiety in the Silane Coupling Agent The aromatic conjugated moiety (i.e., the Y group), such as the aniline-derived moiety, pyrrole-derived moiety and thiophene-derived moiety in the silane coupling agent may readily form an electrically conductive polymer moiety upon polymerization, and thus improve the electron conductivity and charge/discharge capacity of the whole anode, especially at high current density. The polymerization may be conducted by employing an oxidizing agent, or by exposing the silane coupling agent to ultraviolet irradiation and/or microwave irradiation.

iv) Formation of a Three-Dimensional Conductive Network Through Reactions Between the Polymerized Silane Coupling Agent and the Carboxyl-Containing Binder On the one hand, the —NH— group in the polyaniline moiety and polypyrrole moiety may react with the carboxyl group in the carboxyl-containing binder to form an amido group by eliminating a water molecule.

On the other hand, under an acidic condition provided by the carboxyl-containing binder, the π-conjugated system of the polyaniline moiety, polypyrrole moiety and the polythiophene moiety in the polymerized silane coupling agent may remove an electron to form a cation, which may also be referred to as "p-doping". Meanwhile, the carboxyl-containing binder may accept an electron to form an anion. The cation and the anion thus generated may electrostatically combine together to form a salt. For example, the polyaniline moiety may be p-doped and converted into a structure represented by The polypyrrole moiety may be p-doped and converted into a structure represented by The polythiophene moiety may be p-doped and converted into a structure represented by Herein, the wavy line "〰" indicates the position where the p-doped polyaniline moiety, polypyrrole moiety or the poly thiophene moiety is linked to the rest of the polymerized silane coupling agents. "⊕" indicates a p-doped position in the polyaniline moiety, polypyrrole moiety or the polythiophene moiety. "A'" represents an anion obtained from the carboxyl-containing binder by accepting an electron. Therefore, the polymerized and p-doped silane coupling agent may electrostatically connect with the carboxyl-containing binder.

Figure 1:
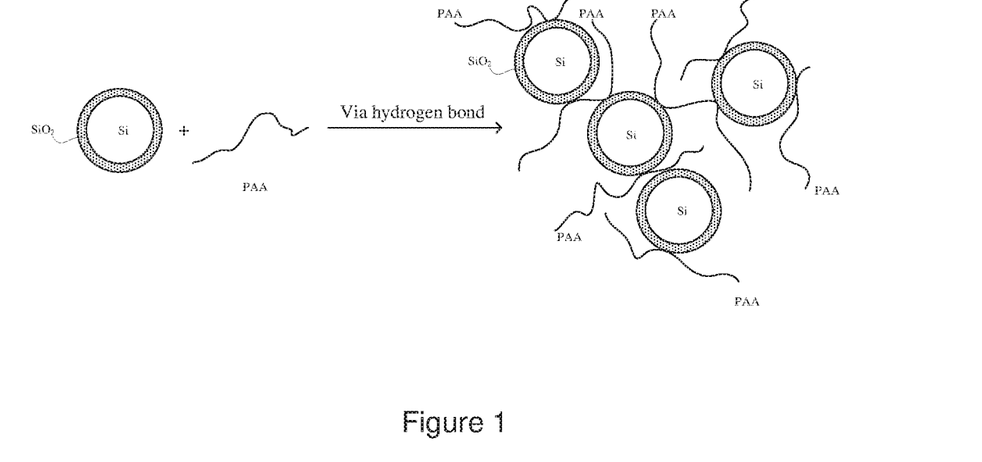
FIG. 1 schematically illustrates a presumed bonding mechanism of an anode composition not comprising a silane coupling agent.

FIG. 1 (not drawn to scale) schematically illustrates a presumed bonding mechanism of an anode composition that contains silicon particles and polyacrylic acid, but does not contain a silane coupling agent. In the anode composition shown in FIG. 1, the silicon particles are connected together by hydrogen bonds between their surface hydroxyl groups and the carboxylic groups of the polyacrylic acid. However, the hydrogen bonds and a linear binding network thus formed are not strong enough to endure the volumetric change of the silicon particles during repeated charge/discharge cycles. Furthermore, the resultant binding network is not electrically conductive, which may inhibit electron transmission and impair electrochemical activity of the silicon particles.

Comparing with the anode composition shown in FIG. 1, the silane coupling agent in the anode composition according to the present disclosure may polymerize with itself, condense with itself, and react with the silicon-based active material and also with the carboxyl-containing binder, and thereby form a three-dimensional network through covalent bonds and electrostatic actions, which are stronger than hydrogen bonds. Furthermore, as mentioned above, the resultant three-dimensional network is electrically conductive, which may improve electron transmission and electrochemical activity of the silicon-based active material.

In contrast, when employing a silane coupling agent (such as KH-550, i.e. γ-aminopropyl triethoxysilane ($NH_2C_3H_6Si(OC_2H_5)_3$) that contains an aliphatic amino group or aliphatic imino group, but does not contain an aromatic conjugated moiety (such as a aniline-derived moiety, pyrrole-derived moiety and thiophene-derived moiety), an electronically insulative network is formed, which inhibits electron transmission and hinders the electrochemical activity of the silicon-based active material, and leads to a poor rate performance.

Therefore, the anode composition according to the present disclosure may impart excellent electrochemical properties, especially excellent cycling stability and rate performance to lithium ion batteries.

Component d): Carbon Material

According to some examples of the present disclosure, the anode composition may optionally comprise a carbon material. The carbon material may increase the conductivity and/or capacity of the anode.

There is no specific limitation to the carbon material, and those which are known for use in lithium ion batteries may be used. In some examples, the carbon material may be selected from the group consisting of carbon black, super P, acetylene black, Ketjen black, graphite, graphene, carbon nanotubes and vapour grown carbon fibers. For example, super P may be commercially available from Timical.

In some examples, the carbon material may be in the form of powders, or may be ground into powders.

According to some examples of the present disclosure, the content of the carbon material may be from 0% by weight to 80% by weight, for example, front 5% by weight to 80% or from 20% by weight to 60% by weight, based on the total weight of the anode composition.

Component e): Chain Extender

According to some examples of the present disclosure, the anode composition may optionally comprise component e): a chain extender. The chain extender may copolymerize with the aromatic conjugated moiety of the silane coupling agent, thereby allowing the polymer chain to propagate and enhance the electron conductivity of the whole anode.

In some examples, the chain extender may be selected from the group consisting of aniline, pyrrole, thiophene and their derivatives, in some examples, the chain extender corresponds to the aromatic conjugated moiety of the silane coupling agent. For example, in the case where an "aniline-derived moiety" is contained in the silane coupling agent, aniline or its derivative may be employed as chain extender. In the case where a "pyrrole-derived moiety" is contained in the silane coupling agent, pyrrole or its derivative may be employed as chain extender. In the case where a "thiophene-derived moiety" is contained in the silane coupling agent, thiophene or its derivative may be employed as chain extender.

According to some examples of the present disclosure, the content of the chain extender may be from 0 to 30% by weight, for example, about 5%, about 10%, about 15%, about 20%, about 25 or about 35%, based on the total weight of the anode composition.

Preparation Process of an Anode

There is no specific limitation to the preparation process of the anode. In some examples, the process for preparing an anode may comprise:

preparing a slurry by mixing all components of the anode composition according to the present disclosure with water or a water-containing solvent;

allowing the silane coupling agent to polymerize so as to obtain a polymerized product; and coating the polymerized product onto a current collector.

The term "water-containing solvent" as used in this disclosure means a solvent mixture contains water and a solvent other than water, such as a mixture of water and an alcohol.

In some examples, the polymerization is conducted by employing an oxidizing agent, or exposing the slurry to ultraviolet irradiation and/or microwave irradiation.

In some examples, the oxidizing agent may be selected from the group consisting of ammonium persulfate (($NH_4)_2S_2O_8$), iron (III) chloride, copper (II) chloride, silver nitrate, hydrogen peroxide, chloroauric acid and ammonium cerium (IV) nitrate. For example, ($NH_4)_2S_2O_8$ may be commercially available from Sinopharm Chemical Reagent Co., Ltd. The oxidizing agent may also be removed, physically and/or chemically, after the silane coupling agent is polymerized.

In the case where an oxidizing agent is used, it may not only initiate the polymerization of the silane coupling agent, but also initiate the copolymerization of the chain extender (if any) with the silane coupling agent. The total amount of the oxidizing agent to be used is the sum of the amount of the oxidizing agent which the silane coupling agent needs to polymerize and the amount of the oxidizing agent which the chain extender (if any) needs to copolymerize. In some examples, the weight ratio of the silane coupling agent to the oxidizing agent needed by the silane coupling agent may vary from 1:1 to 4:1, for example, 1:1, 2:1, 3:1 or 4:1; and the weight ratio of the chain extender to the oxidizing agent needed by the chain extender is from 4:1 to 1:4, for example, 4:1, 3:1, 2:1 or 1:1.

Lithium Ion Battery

The lithium ion battery according to the present invention may comprise an anode prepared from the anode composition according to the present disclosure, or comprising an anode prepared by the process according to the present disclosure.

The lithium ion batteries according to the present disclosure may be used in energy storage systems and electric vehicles.

EXAMPLES

Materials

Nano silicon particles: silicon-based active material, 50-200 nm, available from Alfa-Aesar.

Super P: carbon material, 40 nm, available from Timical.

PAA: polyacrylic acid, binder, ~450 000, available from Aldrich,

ND42: N-[(triethoxysilyl)methyl])aniline, silane coupling agent containing an aromatic conjugated moiety, available from Nanjing Diamond Chem Co., Ltd.

KI1550: γ-aminopropyl triethoxysilane, silane coupling agent containing no aromatic conjugated moiety, available from Sinopharm Chemical Reagent Co. Ltd.

$(NH_4)_2S_2O_8$: oxidizing agent, available from Sinopharm Chemical Reagent Co., Ltd.

Aniline: chain extender, available from Sinopharm Chemical Reagent Co. Ltd.

ET20-26: polyethylene (PE), separator, available from ENTEK.

Example 1

[Preparation of an Anode]

800 mg nano silicon particles were mixed with 100 mg Super P and 100 mg PAA in water to obtain a mixture. After stirring for 1 h, 4 mg ND42 was added into the mixture. Subsequently, the mixture was stirred for another 4 h, then 2 mg $(NH_4)_2S_2O_8$ was added into the mixture. After stirring for another 1 h, the resultant slurry was coated on a Cu foil, then dried at 70° C. in vacuum for 8 h. The coated Cu foil was cut into several Φ12 mm anodes. Considering that the weight ratio of the silane coupling agent (ND 42) to the nano silicon particles was 0.5:100, the anode obtained from Example 1 is abbreviated to Si-0.5% ND42-PAA.

[Preparation of a Cell]

A coin cell (CR2016) was assembled in an Argon-filled glovebox (MB-10 compact, MBraun) by using the anode obtained above. A Li metal foil was used as a counter electrode. 1M $LiPF_6$ in FEC/EC/DMC (1:5:5 by volume, a mixture of fluoroethylene carbonate (FEC), ethylene carbonate (EC) and dimethyl carbonate (DMC)) was used as an electrolyte. ET20-26 was employed as a separator.

Example 2

A cell was prepared in the same way as described above for Example 1, except that 8 mg ND42 was used instead of 4 mg ND42 and 4 mg $(NH_4)_2S_2O_8$ was used instead of 2 mg $(NH_4)_2S_2O_8$. Considering that the weight ratio of the silane coupling agent (ND 42) to the nano silicon particles was 1:100, the anode obtained from Example 2 is abbreviated to Si-1% ND42-PAA.

Example 3

A cell was prepared in the same way as described above for Example 1, except that 0.8 mg ND42 was used instead of 4 mg ND42 and 0.4 mg $(NH_4)_2S_2O_8$ was used instead of 2 mg $(NH_4)_2S_2O_8$. Considering that the weight ratio of the silane coupling agent (ND 42) to the nano silicon particles was 0.1:100, the anode obtained from Example 3 is abbreviated to Si-0.1% ND42-PAA.

Example 4

A cell was prepared in the same way as described above for Example 1, except that 24 mg aniline was additionally added during preparation of the anode and 26 mg $(NH_4)_2S_2O_8$ was used instead of 2 mg $(NH_4)_2S_2O_8$. Here, 26 mg $(NH_4)_2S_2O_8$ was the sum of 2 mg $(NH_4)_2S_2O_8$ needed by ND42 and 24 mg $(NH_4)_2S_2O_8$ needed by aniline. Considering that the aniline copolymerized with ND42 to form a polyaniline (PANI)-ND42 copolymer, and that the weight ratio of the silane coupling agent (ND42):aniline:nano silicon particles was 0.5:3:100, the anode obtained from Example 4 is abbreviated to Si-0.5% ND42-3% PANI-PAA.

Comparative Example 1

A cell was prepared in the same way as described above for Example 1, except that 4 mg KH550 was used instead of 4 mg ND42, and no $(NH_4)_2S_2O_8$ was used. Considering that the weight ratio of the slime coupling agent (KH550) to the nano silicon particles was 0.5:100, the anode obtained from Comparative Example 1 is abbreviated to Si-0.5% KH550-PAA.

Comparative Example 2

A cell was prepared in the same way as described above for Example 1, except that neither silane coupling agent nor $(NH_4)_2S_2O_8$ was used. Hereinafter, the anode obtained from Comparative Example 2 is abbreviated to Si-PAA.

Comparative Example 3

A cell was prepared in the same way as described above for Example 1, except that 24 mg ND42 was used instead of 4 mg ND42 and 12 mg $(NH_4)_2S_2O_8$ was used instead of 2 mg $(NH_4)_2S_2O_8$. Considering that the weight ratio of the silane coupling agent ND 42 to the nano silicon particles was 3:100, the anode obtained from Comparative Example 3 is abbreviated to Si-3% ND42-PAA.

[Effects of Different Silane Coupling Agents]

Figure 2:
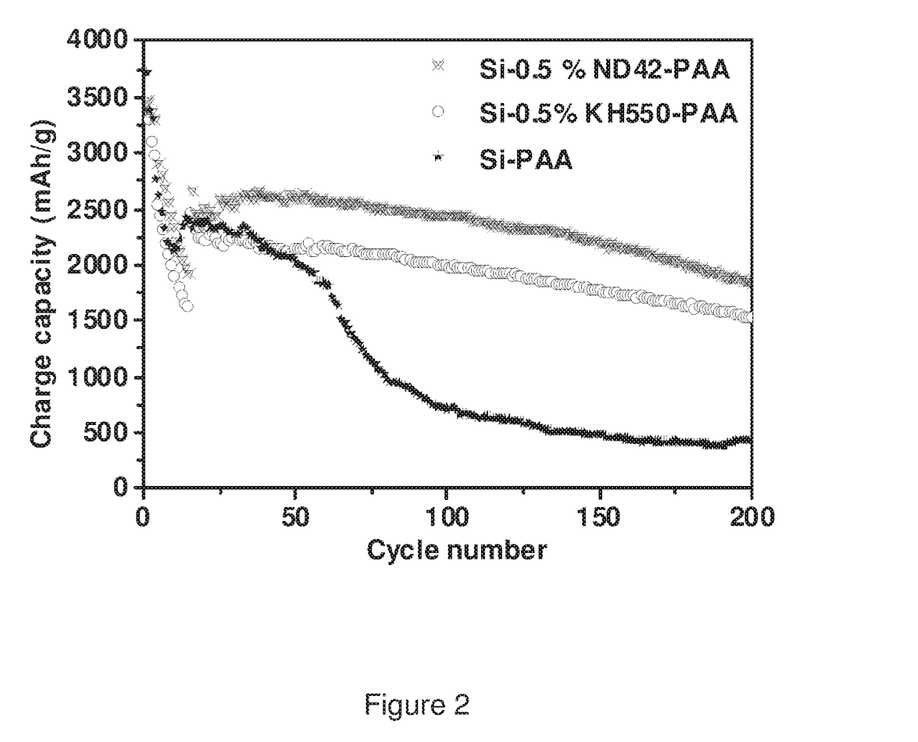
FIG. 2 compares cycling performances of cells prepared according to an Example according to the present disclosure and some Comparative Examples.
Figure 3:
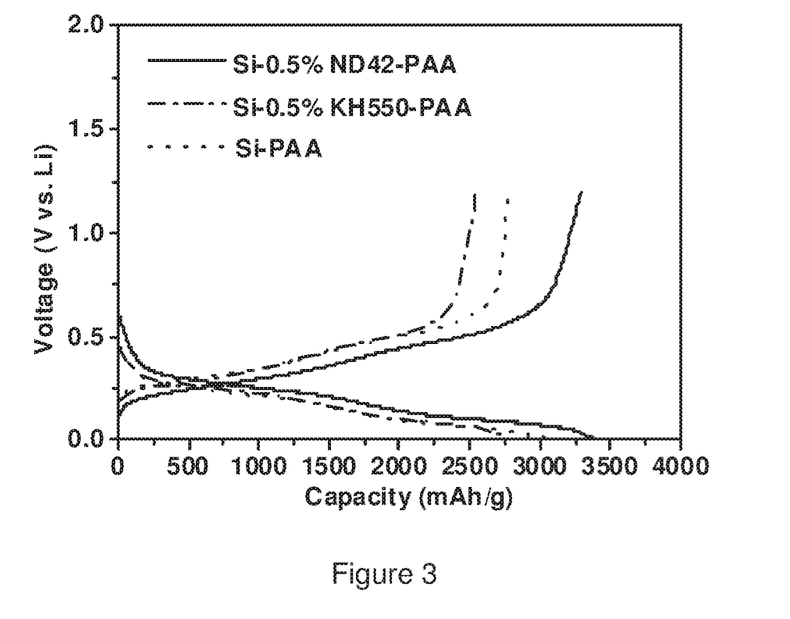
FIG. 3 compares discharge/charge profiles of cells prepared according to an Example according to the present disclosure and some Comparative Examples.

FIG. 2 compares the cycling performances of the cells of Example 1 (containing Si-0.5% ND42-PAA), Comparative Example 1 (containing Si-0.5% KH550-PAA) and Comparative Example 2 (containing Si-PAA without a silane coupling agent). FIG. 3 compares the discharge/charge profiles of these three cells at a high current density of 1.5 A $g^{-1}$.

The cycling performance of each cell was evaluated on a LAND battery test system (Wuhan Kingnuo Electronics Co., Ltd., China) at 25° C. Each cell was discharged/charged within a voltage range of from 0.01 to 1.2V (vs Li/Li$^+$) and at 0.1 A $g^{-1}$ for the 1$^{st}$ cycle, at 0.3 A $g^{-1}$ for the 2$^{nd}$ and 3$^{rd}$ cycles, and at a constant current density of 1.5 A $g^{-1}$ for the following cycles. The mass loading of the nano silicon particles in each anode of the cells is about 0.5 mg/cm$^2$.

The rate performance of each cell was evaluated on a LAND battery test system (Wuhan Kingnuo Electronics Co., Ltd., China) at 25° C. Each cell was discharged/charged within the voltage range of from 0.01 to 1.2V (vs Li/Li$^+$) at a constant current density of 1.5 A $g^{-1}$.

By referring to FIG. 2 and FIG. 3, it can be seen that Si-0.5% KH550-PAA and Si-0.5% ND42-PAA, which formed enhanced binding networks, showed better cycling performances than Si-PAA which only form hydrogen bonds. In addition, Si-0.5% ND42-PAA showed higher capacity than Si-0.5% KH550-PAA, especially at a high current density. What's more, compared with Si-0.5% KH550-PAA, Si-0.5% ND42-PAA showed lower charge voltage, higher discharge voltage and higher coulombic efficiency at a high current density of 1.5 A/g, as shown in FIG. 3. These results indicate that Si-0.5% ND42-PAA had a better rate capability owning to the conductive polymer layer formed on Si surface.

[Effects of Different Contents of Silane Coupling Agents]

Figure 4:
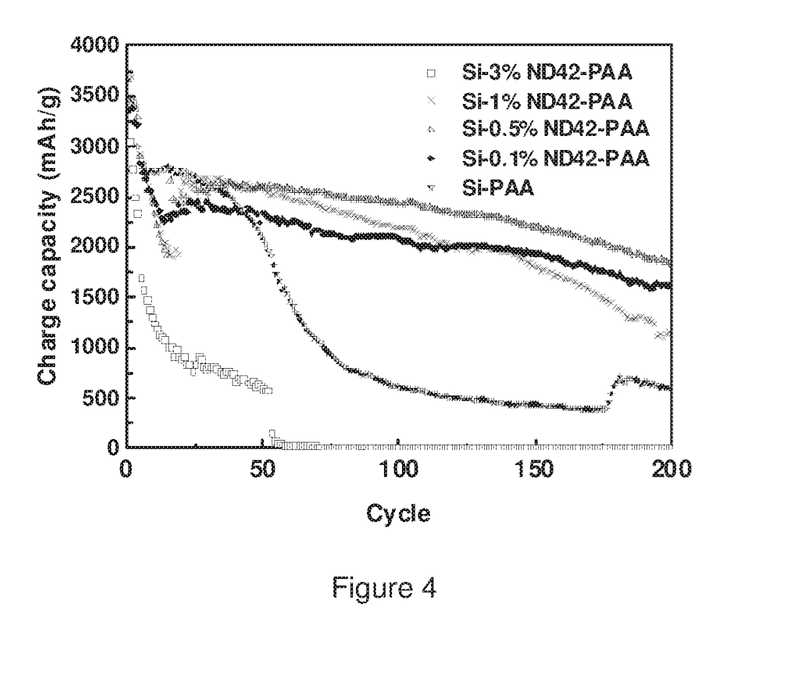
FIG. 4 compares cycling performances of cells prepared according to some Examples according to the present disclosure and some Comparative Examples.

FIG. 4 compares the cycling performances of the cells of Example 1 (containing Si-0.5% ND42-PAA), Example 2 (containing Si-1% ND42-PAA), Example 3 (containing Si-0.1% ND42-PAA) with Comparative Example 2 (containing no silane coupling agent) and Comparative Example 3 (containing Si-3% ND42-PAA). The test condition of the cycling performance was the same as that mentioned above. By referring to FIG. 4, it can be seen that the cells according to Example 1, Example 2 and Example 3 exhibited excellent cycling stabilities.

[Effect of a Chain Extender]

Figure 5:
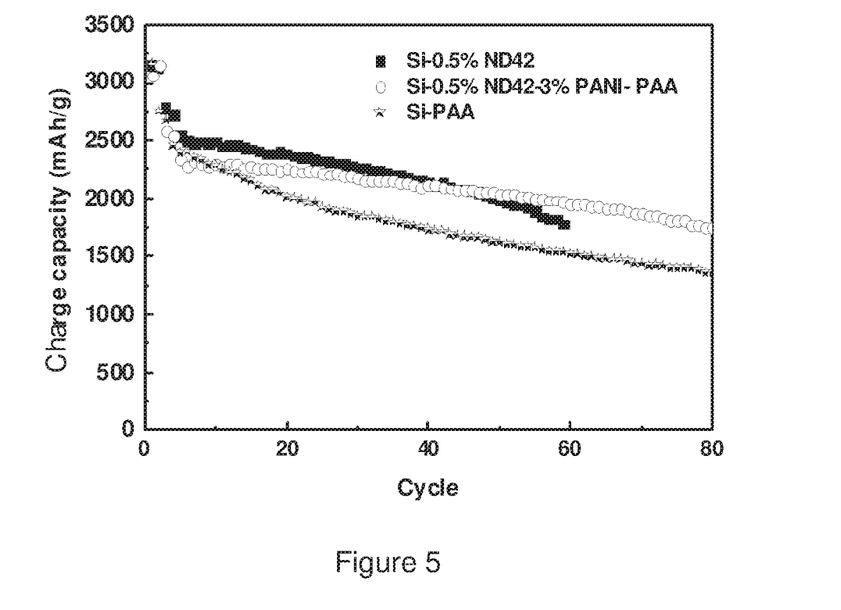
FIG. 5 compares cycling performances of cells prepared according to some Examples according to the present disclosure and a Comparative Example.

FIG. 5 compares the cycling performances the cells of Example 1 (containing Si-0.5% ND42-PAA), Example 4 (containing Si-0.5% ND42-3% PANI-PAA) and Comparative Example 2 (containing no silane coupling agent). Each cell was discharged/charged within a voltage range of from 0.01 to 1.2V (vs Li/Li$^+$), and at 0.1 A g$^{-1}$ for the first two cycles and at 0.3 A g$^{-1}$ in the next two cycles, then discharged at 0.5 A/g and charged at 2.0 A/g for the following cycles. The mass loading of the nano silicon particles in each anode of the cells is about 0.5 mg/cm$^2$. By referring to FIG. 5, it can be seen that Si-0.5% ND42-PAA and Si-0.5% ND42-3% PANI-PAA showed much better cycling performances than Si-PAA due to the enhanced binding network. The cycling performance of Si-0.5% ND42-3% PANI-PAA was even better than Si-0.5% ND42-PAA owning to the addition of aniline, which allowed the conductive polymer chain to propagate.

While the disclosure has been described with reference to certain examples, those skilled in the art will appreciate that various modifications, changes, omissions, and substitutions can be made without departing from the spirit of the disclosure. It is intended, therefore, that the present disclosure be limited only by the scope of the following claims.

The invention claimed is:

1. An anode composition for lithium ion batteries, comprising:
   a) a silicon-based active material;
   b) a carboxyl-containing binder; and
   c) a silane coupling agent represented by the following formula (1):

$$Y-(CH_2)_n-Si-X_3 \quad (1)$$

wherein Y represents a non-hydrolytic group that is capable of forming a conductive polymer moiety upon polymerization;
   X each independently represents a hydroxyl group, or a hydrolysable group selected from the group consisting of halogen atoms, alkoxy groups, ether groups and siloxy groups; and the three X groups may be identical with or different from each other; and
   n represents an integer from 0 to 3;
   wherein the weight ratio of the silane coupling agent to the silicon-based active material is from 0.1:100 to 1:100.

2. The anode composition according to claim 1, wherein the silane coupling agent is represented by formula (2):

wherein R$^a$ and n have the same definitions as those given for formula (1), R$^e$ each independently represents an alkyl group, and the three R$^e$ groups may be identical with or different from each other.

3. The anode composition according to claim 1, wherein the silicon-based active material is selected from the group consisting of silicon, silicon alloys and silicon/carbon composites.

4. The anode composition according to claim 1, wherein the carboxyl-containing binder is a carboxylic acid, or a mixture of a carboxylic acid and its alkali metal salt.

5. The anode composition according to claim 1, further comprising: d) a carbon material, wherein the carbon material is selected from the group consisting of carbon black, super P, acetylene black, Ketjen black, graphite, graphene, carbon nanotubes and vapour grown carbon fibers.

6. The anode composition according to claim 1, further comprising: e) a chain extender, which copolymerizes with the conductive polymer moiety obtainable from the silane coupling agent.

7. The anode composition according to claim 1, comprising:
   a) from 5% to 85% by weight of the silicon-based active material;
   b) from 5% to 25% by weight of the carboxyl-containing binder;
   c) the silane coupling agent;
   d) from 0 to 80% by weight of carbon material; and
   e) from 0 to 30% by weight of chain extender,
   wherein the weight percents of components a), b), d) and e) are based on the total weight of the anode composition.

8. The anode composition according to claim 1, wherein in formula (1), Y is derived from aniline, pyrrole, thiophene and any combination thereof.

9. The anode composition according to claim 8, wherein Y is selected from the group consisting of wherein * indicates the position where Y is linked to a moiety represented by —(CH$_2$)$_n$—Si—X$_3$ in the silane coupling agent; and R$^a$ and R$^b$ each independently represents a hydrogen atom, or a substituent selected from the group consisting of alkyl groups, alkoxy groups, alkenyl groups, alkynyl groups, aromatic groups and aroxy groups.

10. The anode composition according to claim 1, wherein the carboxyl-containing binder is a carboxylic acid, or a mixture of a carboxylic acid and its alkali metal salt, wherein the carboxylic acid is selected from the group consisting of polyacrylic acid, carboxymethyl cellulose, alginic acid and xanthan gum.

11. The anode composition according to claim 1, further comprising: e) a chain extender, which copolymerizes with the conductive polymer moiety obtainable from the silane coupling agent, and the chain extender is selected from the group consisting of aniline, pyrrole, thiophene and their derivatives.

12. The anode composition according to claim 1, wherein the weight ratio of the silane coupling agent to the silicon-based active material is about 0.5:100.

13. A lithium ion battery, comprising an anode having the anode composition according to claim 1.

14. A process for preparing an anode for lithium ion batteries, the process comprising:
   preparing a slurry by mixing all components of the anode composition according to claim 1 with water or a water-containing solvent;
   allowing the silane coupling agent to polymerize so as to obtain a polymerized product; and
   coating the polymerized product onto a current collector.

15. The process according to claim 14, wherein the polymerization is conducted by employing an oxidizing agent, or by exposing the slurry to ultraviolet irradiation and/or microwave irradiation.

16. The process according to claim 15, wherein the oxidizing agent is selected from the group consisting of ammonium persulfate, iron (III) chloride, copper (II) chloride, silver nitrate, hydrogen peroxide, chloroauric acid and ammonium cerium (IV) nitrate.

* * * * *